(12) United States Patent
Owen

(10) Patent No.: US 8,346,548 B2
(45) Date of Patent: Jan. 1, 2013

(54) AURAL SIMILARITY MEASURING SYSTEM FOR TEXT

(75) Inventor: Mark Owen, Cambridge (GB)

(73) Assignee: Mongoose Ventures Limited, Windsor (GB)

( * ) Notice: Subject to any disclaimer, the term of this patent is extended or adjusted under 35 U.S.C. 154(b) by 791 days.

(21) Appl. No.: 12/042,690

(22) Filed: Mar. 5, 2008

(65) Prior Publication Data

US 2008/0228485 A1 Sep. 18, 2008

(30) Foreign Application Priority Data

Mar. 12, 2007 (GB) .................................. 0704772.3

(51) Int. Cl.
*G10L 15/00* (2006.01)
(52) U.S. Cl. ............... 704/231; 715/863; 705/27; 704/4; 704/260; 704/258; 704/254; 704/209; 704/267
(58) Field of Classification Search .................. 704/260, 704/4, 258, 254, 209, 231; 715/863; 705/27; 706/267
See application file for complete search history.

(56) References Cited

U.S. PATENT DOCUMENTS

| | | | |
|---|---|---|---|
| 3,952,184 A | | 4/1976 | Bassard |
| 5,490,234 A | * | 2/1996 | Narayan ....................... 704/260 |
| 5,918,214 A | * | 6/1999 | Perkowski ................. 705/26.61 |
| 6,029,131 A | * | 2/2000 | Bruckert ........................ 704/260 |
| 6,411,932 B1 | * | 6/2002 | Molnar et al. ................. 704/260 |
| 7,295,980 B2 | * | 11/2007 | Garner et al. .................. 704/254 |
| 2002/0022960 A1 | | 2/2002 | Charlesworth et al. |
| 2003/0088416 A1 | * | 5/2003 | Griniasty ....................... 704/256 |
| 2003/0120482 A1 | * | 6/2003 | Tian .............................. 704/209 |
| 2003/0189603 A1 | * | 10/2003 | Goyal et al. ................... 345/863 |
| 2005/0071163 A1 | * | 3/2005 | Aaron et al. ................... 704/260 |
| 2005/0197838 A1 | * | 9/2005 | Lin et al. ....................... 704/260 |
| 2006/0229863 A1 | * | 10/2006 | McCuller .......................... 704/4 |
| 2007/0150279 A1 | * | 6/2007 | Gandhi et al. ................. 704/258 |
| 2007/0198265 A1 | * | 8/2007 | Yao ............................... 704/254 |
| 2008/0215562 A1 | * | 9/2008 | Biesenbach et al. .............. 707/5 |

FOREIGN PATENT DOCUMENTS

CN 1581159 2/2005

* cited by examiner

*Primary Examiner* — Michael Colucci
(74) *Attorney, Agent, or Firm* — Volpe and Koenig, P.C.

(57) ABSTRACT

The aural similarity measuring system and method provides a measure of the aural similarity between a target text (10) and one or more reference texts (11). Both the target text (10) and the reference texts (11) are converted into a string of phonemes (15) and then one or other of the phoneme strings are adjusted (16) so that both are equal in length. The phoneme strings are compared (12) and a score generated representative of the degree of similarity of the two phoneme strings. Finally, where there is a plurality of reference texts the similarity scores for each of the reference texts are ranked (13). With this aural similarity measuring system the analysis is automated thereby reducing risks of errors and omissions. Moreover, the system provides an objective measure of aural similarity enabling consistency of comparison in results and reproducibility of results.

35 Claims, 3 Drawing Sheets

AURAL SIMILARITY MEASURING SYSTEM FOR TEXT

This application is a continuation in part of and claims priority to United Kingdom Patent Application Serial No. 0704772.3, filed 12 Mar. 2007, inventor Mark Owen, entitled "Aural Similarity Measuring System For Text", the contents of which are incorporated herein by reference, and with priority claimed for all commonly disclosed subject matter.

FIELD OF THE INVENTION

The present invention relates to an aural similarity measuring system and method for text and to a software product for measuring aural similarity of texts. The present invention is particularly suited for, but is not limited to, use in the assessment of trademark similarity.

The general function of trademarks is to distinguish a person's or an organisation's products or services from those of other people and other companies or organisations in order to engender customer loyalty. It is important therefore that a trademark is capable of being recognised by customers and of not being confused with other trademarks. When a person, company or other organisation is deciding upon a new trademark, it is usual for searches to be conducted to check whether their preferred new trademark is not identical to or confusingly similar to an existing trademark. Such searches usually involve checks with individuals familiar with the relevant industry, through relevant trade journals to identify trademarks in use in that industry, as well as checks through national trademark registers. In addition, where an application is filed to officially register a new trademark with a registration authority, many registration authorities conduct searches through their own registers to identify earlier registrations or pending applications of trademarks identical or similar to the new trademark. When considering the potential for confusion between two trademarks, not only must visual similarity be considered but also conceptual and aural similarity.

DESCRIPTION OF THE RELATED ART

In the past, searches through the official trademark registers have been carried out manually. In view of the vast number of registered trademarks such manual searches are therefore time consuming and are also potentially unreliable. A person manually searching through such a plethora of registered trademarks is liable to overlook a potentially similar trademark. Such a failure can prove extremely costly where a person or organisation in the process of adopting a new trademark is forced to abandon their new trademark and to destroy all packaging or other material bearing that new trademark because of a, previously unidentified, conflict with a similar prior-existing trademark.

Because of the problems inherent in manual searching, attempts have been made to computerise the searching of trademark data on official trademark registers. Whilst such searching software is effective in the identification of identical trademarks, the identification of similar marks remains semi-manual. To identify similar trademarks a user of the searching software is required to identify permutations of the trademark being searched so that identical searches can be performed in respect of these permutations and to identify key, distinctive elements of a trademark, e.g. its suffix or prefix, for which identical searches are then performed for those elements, irrespective of any other elements that might be present.

The semi-manual nature of searches for confusingly similar trademarks means that such searches remain prone to error. Also, the decision on whether or not two trademarks are similar remains the decision of the user and, as such, is subjective.

So-called fuzzy matching program techniques are known for determining the similarity of two objects automatically, for example in DNA sequence matching, in spell checker 'suggested correction' generation and in directory enquiries database searches. Such techniques have not, though, been employed in automated trademark searching.

Conventional fuzzy matching techniques fall broadly into two categories, which might be called 'edit distance methods' and 'mapping methods'. In the case of edit distance methods, the similarity of two words A and B are measured by answering a question along the lines of "what is the minimum number of key strokes it would take to edit word A into word B using a word processor?" The Levenshtein distance is the most popular of these measures. Edit distance methods are essentially a measure of visual similarity and are not directly suitable for measuring aural similarity. They also lack flexibility and are not very discriminating.

Mapping methods work by assigning a key value to each possible word. However, there are many times fewer different keys than different words, and so several words are mapped onto each key. The mapping is designed so that similar-sounding words receive identical keys, and so a direct look-up from the key is possible. Popular mapping methods include Soundex™, Metaphone™ and Double Metaphone™. It is possible to imagine the space of words divided into regions, where each region contains all the words mapped to a given key: mapping methods work poorly with words near to the edge of a region of this space as their similarity to nearby words that happen to be in an adjacent region is not recognised. They have the further disadvantage of simply providing a yes-no answer to the similarity question rather than assigning a value representative of similarity. Mapping methods are also unsuitable for matching substrings.

SUMMARY OF THE INVENTION

The present invention seeks to overcome the disadvantages in the trademark searching procedures described above and thus seeks to provide a trademark searching system and a trademark searching software product which automates assessment of aural and/or visual similarity between trademarks.

Moreover, with the present invention substrings (where the sound of one mark is contained entirely within that of another) can be more readily matched, which is an important aspect of trademark similarity assessment.

The present invention therefore provides an aural similarity measuring system for measuring the aural similarity of texts comprising: a text input interface; a reference text source; an output interface; and a processor adapted to convert the input text into a string of phonemes, to adjust the phoneme string of the input text and/or a phoneme string of a reference text so that the two phoneme strings are equal in length, and to assign a score to the reference text representative of the similarity of the two phoneme strings, which score is output via the output interface.

Preferably the system includes a data store in which is stored a plurality of reference texts. More preferably, the data store may further contain a plurality of phoneme strings each string being associated with a reference text.

In a preferred embodiment the processor is further adapted to select one or more reference texts from the plurality of reference texts for outputting via the output interface, the selection being based on the score assigned to each reference text.

Also, ideally the processor is adapted to determine all possible adjustments of one or both of the input text phoneme string and the reference text phoneme string and is adapted to identify the score representing the highest measure of similarity with respect to all of the possible phoneme string adjustments.

In the preferred embodiment, the processor is adapted to adjust the phoneme strings of either or both of the input text and/or the reference text by inserting gaps into the phoneme strings. Furthermore, the processor may be adapted to identify aligned phonemes which differ; to allocate predetermined phoneme scores for each pair of differing aligned phonemes; and to summing the individual phoneme scores to thereby assign a score to the reference text.

With the preferred embodiment, the processor may be adapted to weight the phoneme scores in dependence upon the position of the pair of phonemes in the phoneme strings. Also, the processor may be adapted to weight the phoneme scores such that phoneme scores arising from partial text predetermined as less relevant which is present in the input text are lower than equivalent phoneme scores arising from other partial text in the input text and the processor may be adapted to allocate a higher phoneme score to a grouping of non-adjusted aligned phonemes than to an equivalent grouping of aligned phonemes which have been adjusted.

In a second aspect the present invention provides a trademark searching system comprising an aural similarity measuring system as described above, wherein the reference text source comprises a trademark data source and the processor is adapted to generate a similarity score with respect to the aural similarity between an input trademark and at least one reference trademark from the trademark data source.

In a third aspect the present invention provides an aural similarity measuring server comprising: an input/output interface adapted for communication with one or more remote user terminals and further adapted to receive an input text and to output one or more reference texts each associated with a similarity score; a data store in which is stored a plurality of reference texts; and a processor adapted to convert an input text into a string of phonemes, to adjust the phoneme string of the input text and/or a phoneme string of a reference text so that the two phoneme strings are equal in length, and to assign a score to the reference text representative of the similarity of the two phoneme strings, which score is output via the input/output interface.

In a fourth aspect the present invention provides a trademark searching server comprising an aural similarity server as described above, wherein a plurality of reference trademarks are stored in the data store and the processor is adapted to generate a similarity score with respect to the aural similarity between an input trademark and at least one reference trademark from the data store.

In a fifth aspect the present invention provides an aural similarity measuring software program product comprising program instructions for performing the following steps: a receiving step in which an input text for which an aural similarity score is required is received; a conversion step in which the input text is converted into a string of phonemes; an adjustment step in which the phoneme string for the input text and/or a phoneme string associated with a reference text is adjusted so that the two phoneme strings are equal in length; a ranking step in which the similarity of the two phoneme strings is assigned a score; and an output step in which the reference text and the its ranking is output to the user.

Ideally, the adjustment step and the ranking step are repeated for a plurality of reference texts.

In a preferred embodiment the program product further comprises program instructions for a selection step in advance of the output step wherein one or more reference texts are selected from the plurality of reference texts for outputting, the selection being based on the ranking assigned to each reference texts.

The adjustment step may comprise determining all possible adjustments of one or both of the input text phoneme string and the reference text phoneme string and the ranking step identifies the lowest similarity score with respect to all of the possible phoneme string adjustments.

Preferably, the adjustment step comprises adding one or more gaps in the phoneme string and the one or more gaps made may be added to the beginning or end of a phoneme string.

With the preferred embodiment the ranking step comprises identifying aligned phonemes which differ; allocating predetermined phoneme scores for each pair of differing aligned phonemes and summing the individual phoneme scores. Also, the phoneme scores may be weighted in dependence upon the position of the pair of phonemes in the phoneme strings and/or the phoneme scores may be weighted such that phoneme scores arising from partial text predetermined as less relevant in the input text are lower than equivalent phoneme scores arising from other partial text in the input text. Furthermore, a higher phoneme score may be allocated to a grouping of non-adjusted aligned phonemes than to an equivalent grouping of aligned phonemes which have been adjusted.

In a sixth aspect the present invention provides an aural similarity measuring method for measuring the aural similarity of texts, the method comprising the steps of: receiving an input text for which an aural similarity score is required; converting the input text into a string of phonemes; adjusting the phoneme string for the input text and/or a phoneme string associated with a reference text so that the two phoneme strings are equal in length; ranking the similarity of the two phoneme strings to assign a score; and outputting the reference text and the its ranking to the user.

In a seventh aspect the present invention provides a trademark searching method for measuring the aural similarity of trademarks, the method comprising the steps of: receiving an input trademark for which an aural similarity score is required; converting the input trademark into a string of phonemes; adjusting the phoneme string for the input trademark and/or a phoneme string associated with a reference trademark so that the two phoneme strings are equal in length; ranking the similarity of the two phoneme strings to assign a score; repeating the adjusting and ranking steps for further reference trademarks; and outputting the reference trademarks and their associated rankings to the user.

Thus, with the present invention the aural similarity measurement of texts and the searching of aurally similar trademarks is wholly automated which significantly reduces the risk of errors and omissions and also provides an objective assessment of similarity. The present invention is also adapted to say whether one trademark is more similar than another and thus enables similar trademarks to be ranked. This has the further benefit of helping the user weigh the relative merits of, for example, a distant match with a trademark associated with the same goods or services and a close match with a trademark associated with different goods or services.

BRIEF DESCRIPTION OF THE DRAWINGS

Exemplary embodiments of the present invention will now be described by way of example with reference to the accompanying drawings, in which.

DETAILED DESCRIPTION OF EXEMPLARY EMBODIMENTS

Figure 1:
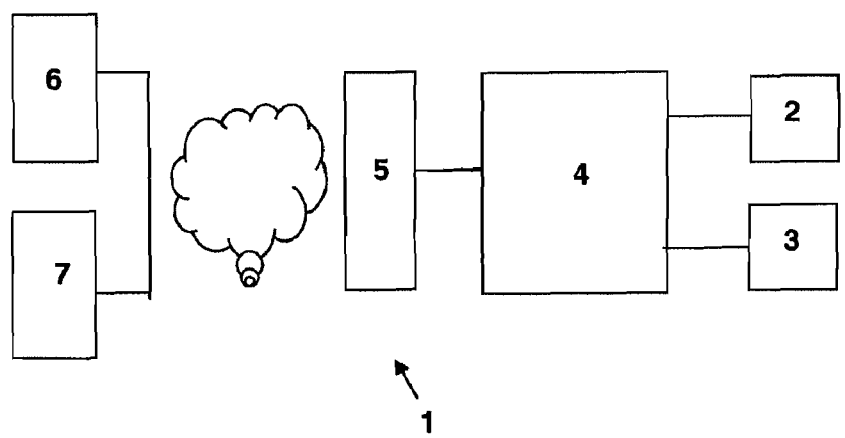
FIG. 1 is a schematic diagram of a trademark searching system in accordance with the present invention.

The trademark searching system 1 illustrated in FIG. 1 comprises the following basic elements: a data store 2, in the form of a memory, in which is stored trademark data; a program store 3, also in the form of a memory, in which is stored a software program product; a processor 4, in communication with the data store 2 and the program store 3, for performing trademark searching functions; an input/output (I/O) interface 5 in communication with the processor 4 for providing user access to and from the processor 4; a user input interface 6 including, for example, a keyboard and/or a tracking device (mouse) and an output interface 7 such as, but not limited to, a display screen and/or printer terminal. The trademark searching system 1 may be implemented as a stand-alone system using a conventional desktop computer. Alternatively, as illustrated in FIG. 1, the trademark searching system may be implemented using a remote server which is in communication by means of the I/O interface 5 with one or more user terminals via a private or public communications network such as, but not limited to, the internet.

Figure 2:
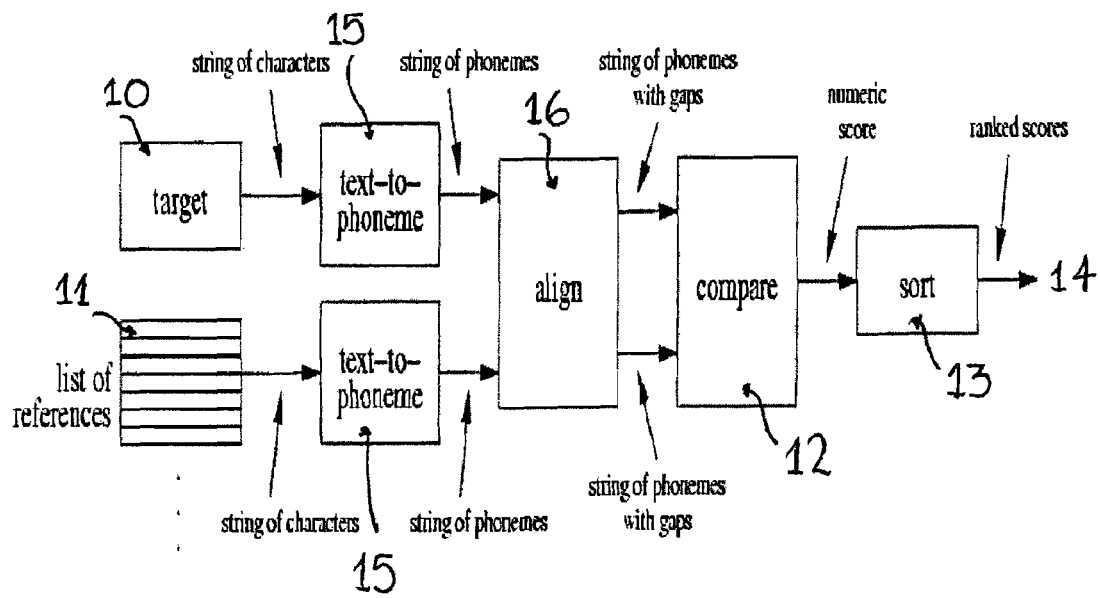
FIG. 2 schematically illustrates the functionality of the trademark searching system in accordance with the present invention.

An overall block diagram of the trademark search system for performing aural similarity searching is shown in FIG. 2. At the top left a trademark for which a search is required, called the 'target', is input 10 by the user into the searching system using the user input interface 6. At the bottom left of FIG. 2 a list of existing trademarks, called 'references', which are to be searched through by the searching system, are accessed 11 for example from the data store 2. In each case the target and references are input as strings of characters. The target is compared 12 in turn with each reference and the similarity between the target trademark and each reference trademark is ranked. The references are then sorted into a list 13 in terms of their similarity ranking with the sorted list being output 14 either as a complete list or as a selection taken from the complete list. Where only a selection of reference trademarks are output, the selection may be made on the basis of those trademarks having a similarity ranking below a predetermined threshold ranking. Alternatively, the selection may be made on the basis of the lowest scoring reference trademarks up to a predetermined number e.g. 50 or 100. The list is output 14 to the user by means of the output interface 7 and displayed, for example, on a display screen and/or printed off.

In order to perform the comparison of the target with a reference trademark the following sequence of steps is performed. Both the target and each reference are converted 15 from a plain textual form into a phonetic form by means of a conversion unit. Although two conversion units are illustrated in FIG. 2, it will, of course, be apparent that the same text-to-phoneme conversion is applied to both the target and the references. Both the target and the reference are now represented as strings of phonemes which correspond to the basic units of speech. For example, the word 'caught' would be converted into the three phonemes /k/, /aw/, and /t/. For clarity here we represent phonemes by letters intended to be evocative of their sound, bracketed by '/' characters; in a practical system they can be represented by numeric codes. After the trademarks have been converted, the phonetic version of each reference is aligned 16 with the phonetic version of the target in turn and once aligned both the target and the reference are communicated from the alignment unit 16 to the comparator 12 for the purposes of determining a similarity ranking for the reference trademark.

Thus, the similarity search generally comprises an inputting step in which the trademark to be searched (the target) is input into the system; a conversion step in which the target trademark is converted into a string of phonemes; an alignment step in which the phoneme string for the target trademark is aligned with a plurality of phoneme strings associated with a respective plurality of reference trademarks; a ranking step in which the similarity of the aligned phoneme strings are assigned a score; and an output step in which the reference trademarks and their assigned similarity scores are output to the user.

Figure 3:
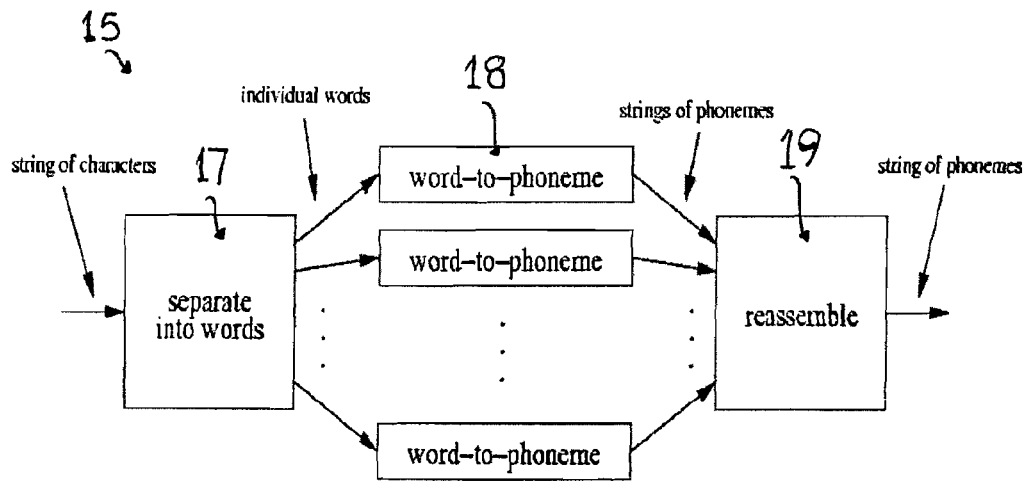
FIG. 3 schematically illustrates the text-to-phoneme conversion performed as part of the similar trademark searching method in accordance with the present invention.

The text-to-phoneme conversion 15 is illustrated in more detail in FIG. 3. The string of characters constituting a trademark is first divided into its constituent words 17 and then each word is separately converted from text to phonemes 18. The results of these text-to-phoneme conversions are then reassembled 19 into a string of phonemes.

Figure 4:
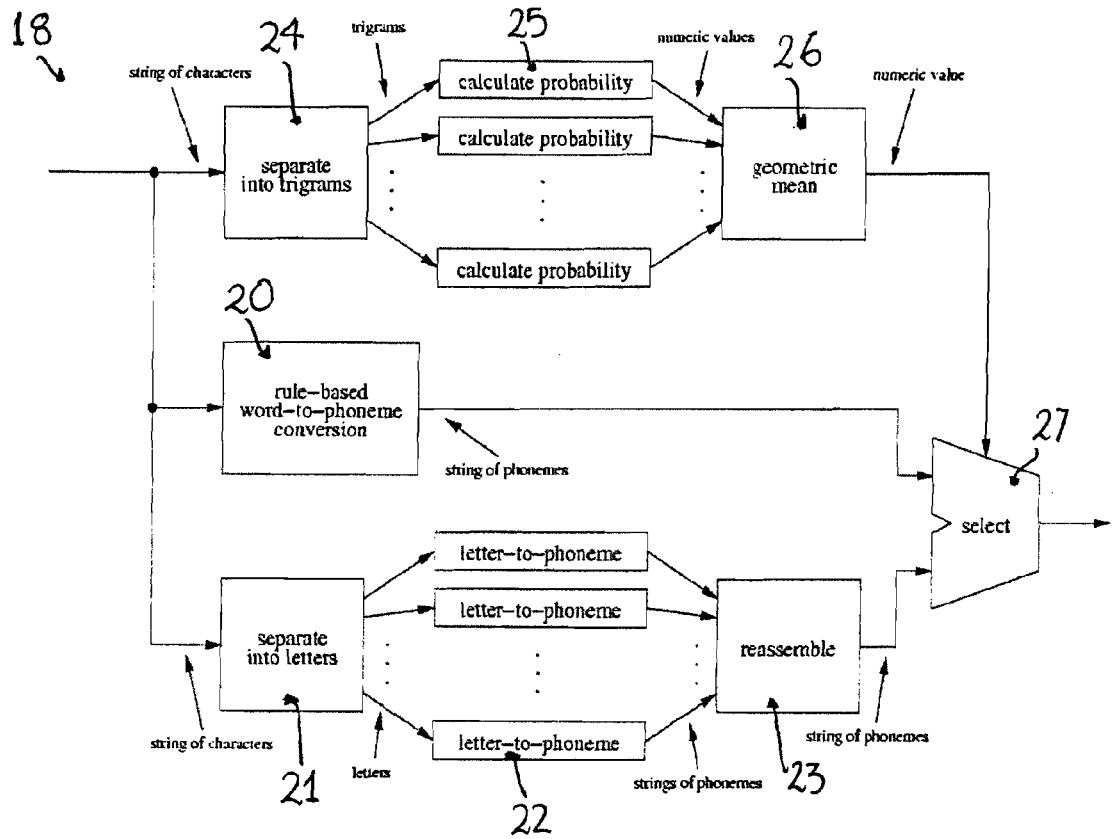
FIG. 4 schematically illustrates the word-to-phoneme conversion performed as part of the similar trademark searching method in accordance with the present invention.

The word-to-phoneme conversion 18 is illustrated in FIG. 4. Across the top of the Figure is a process used to decide whether the word is, on the one hand, an ordinary word or an abbreviation which would naturally be pronounced (such as 'PAL'), or, on the other hand, an abbreviation that would naturally be spelt out (such as 'NTSC'). The processing of each of these two cases is then illustrated in the middle and bottom rows of FIG. 4, respectively. In the former case, i.e. a pronounceable word, a standard rule-based process 20 is applied to convert the word into a string of phonemes. In the latter case, i.e. a spelt out abbreviation, the word is split into its constituent letters 21 which are individually converted into phoneme strings 22, so that "s", for example, becomes /eh/ /s/ and 'w' becomes /d/ /uh/ /b/ /l/ /y/ /oo/. The phoneme strings are then reassembled 23 into a single string representing the pronunciation of the abbreviation.

The choice between the two alternative phonetic representations of a word is made as follows. If the word consists of a single letter or contains digits it is spelt out. (This case is omitted from FIG. 4 for the sake of clarity). Otherwise the word, including the space on either side of it, is divided 24 into overlapping sets of three letters called 'trigrams'. Thus '_PAL_' (with '_' standing for the space) is split into '_PA', 'PAL' and 'AL_', while 'NTSC' is split into '_NT', 'NTS', 'TSC' and 'SC_'. Each of these trigrams is passed through a probability calculation unit 25 where each trigram is converted into a numeric value. The numeric value assigned to each trigram reflects the probability of that trigram forming a part of a pronounceable word and is derived from an analysis of the relative frequencies of trigrams contained in a sample of dictionary words. The geometric mean of the numeric values corresponding to all of the trigrams forming the trademark is then calculated 26. The resultant mean probability is a quantity which can be compared against a predetermined fixed probability threshold (determined empirically) to decide or select 27 which of the two phonetic conversions described above should be used.

An alternative, but less desirable, method for determining whether a word to be converted is a pronounceable word or a series of individually pronounced letters, bases the decision on whether the word to be converted is present in a dictionary. This method is less desirable because a very large number of trademarks include, for example, proper names which might not be covered by a dictionary and also made-up, but nevertheless pronounceable, words.

Figure 5:
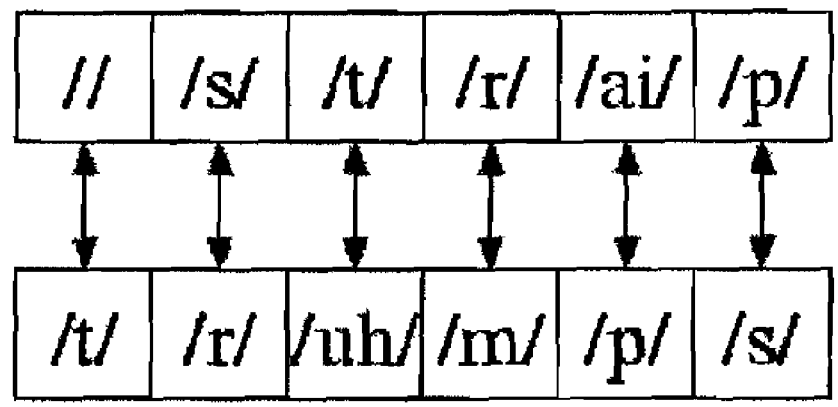
FIG. 5 illustrates a first alignment of phonemes in accordance with the present invention for the words "stripe" and "trumps"
Figure 6:
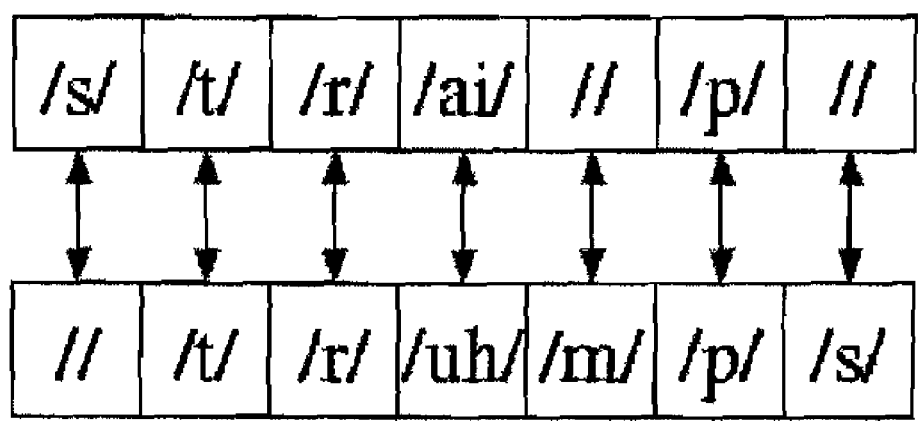
FIG. 6 illustrates a second, alternative alignment of phonemes for the words "stripe" and "trumps", also in accordance with the present invention.

Returning to FIG. 2, as mentioned earlier, the string of phonemes describing the target trademark and the string of phonemes describing a reference trademark are passed through an aligner 16 whose job is to try to match up the two strings of phonemes. In order to match up the two strings of phonemes the aligner 16 inserts gaps into the two strings so that (a) they are made the same length; and (b) as many as possible of the phonemes in corresponding positions are as similar as possible. Thus, the two phoneme strings are warped to aid comparison. As an aid to understanding, consider the following example:

The two trademarks being examined are 'stripe' and 'trumps'. As strings of phonemes these might be represented respectively as '/s/ /t/ /r/ /ai/ /p/' (five phonemes in total) and '/t/ /r/ /uh/ /m/ /p/ /s/' (six phonemes in total). To make these the same length by inserting gaps into them the aligner 16 needs to insert one more gap into the first string than into the second. For example, it could insert a gap at the start of the first string and leave the second string alone: this alignment is illustrated in FIG. 5. An alternative alignment, inserting two gaps into the first string and one gap into the second string, is illustrated in FIG. 6.

Ideally, all possible alignment permutations between the target string of phonemes and the reference string of phonemes are considered. This generates a plurality of sets of aligned pairs of phoneme strings with the alignment within each set being different. Each set of phoneme strings is then assigned a score and the lowest score (representing the highest possible similarity) of all of the sets of phoneme strings is then allocated to the reference trademark as a similarity ranking.

As mentioned above, each set of aligned strings is input into the comparator 12 (see FIG. 2) where each set is assigned a score or similarity ranking calculated on the basis of the difference between them. A high score (i.e., a large difference) thus corresponds to a poor match (little similarity), and a low score to a good match (high similarity). The score value consists of two elements: (a) a phoneme-by-phoneme difference element calculated between corresponding pairs of phonemes; and (b) a value element reflecting the quantity and positions of gaps that were inserted by the aligner 16. The range of scores may, of course, vary but is chosen to be sufficient to enable adequate discrimination between different reference trademarks which are similar with a target trademark in different ways.

The phoneme-by-phoneme difference element is calculated as the sum of difference values between phonemes in corresponding positions in the two aligned strings. Two phonemes have a difference value of zero if they are identical; otherwise the difference value is a small offset plus a combination of individual phonetic feature difference values. These phonetic feature differences include whether the phoneme is a consonantal or vowel sound, whether the sound is voiced or not, and the position in the mouth where the sound is made. Where a phoneme in one string is aligned with a gap in the other, the contribution to the score is based on the features of that phoneme in a similar way. The example in FIG. 5 would give a large difference score because in each of the six phoneme-to-phoneme comparisons the phonemes involved are quite different from one another. In the alignment shown in FIG. 6, however, many of the seven comparisons are between similar or identical phonemes, and so the total difference score would be lower.

As mentioned above, the gap positions chosen by the aligner 16 can contribute to the score. The exact contribution depends on the relative and absolute positions of the gaps. Gaps inserted at the beginning or end of either string are given a smaller difference value than normal: the effect of this is to reduce the total difference score when one string is a substring or similar to a substring of the other. Gaps inserted between consecutive pairs of phonemes incur a greater difference score than normal: the effect of this is to reduce the total difference score when there are consecutive runs of matching or similar phonemes in the two strings. The gap positions shown in FIG. 5 would only result in a small amount being added to the total difference value, whereas the gap positions shown in FIG. 6 would result in a larger addition, chiefly because of the gap inserted between the /ai/ and /p/ phonemes in the rendering of 'stripe'. In practice the various contributions to the score are weighted so that the alignment shown in FIG. 6 would be preferred over that shown in FIG. 5.

As an aid in understanding the scoring of phoneme alignment, Tables 1 and 2 below set out an example of the scoring respectively for each of the two alignments illustrated in FIGS. 5 and 6.

TABLE 1

| STRIPE Phoneme | TRUMPS Phoneme | Initial Phoneme Score | Adjusted Phoneme Score |
|---|---|---|---|
| / / | /t/ | 0.56 | 0.56 |
| /s/ | /r/ | 0.55 | 1.35625* |
| /t/ | /uh/ | 1.0 | |
| /r/ | /m/ | 0.5 | 1.3125* |
| /ai/ | /p/ | 1.0 | |
| /p/ | /s/ | 0.5 | 0.5 |

*the combined phoneme scores have been adjusted down in each case to take into account the positions of the gaps.

The similarity ranking for the phoneme alignment of FIG. 5 is the total of the scores in the Adjusted Phoneme Score column, which is 3.72875

TABLE 2

| STRIPE Phoneme | TRUMPS Phoneme | Initial Phoneme Score | Adjusted Phoneme Score |
|---|---|---|---|
| /s/ | / / | 0.56 | 0.28** |
| /t/ | /t/ | 0.0 | 0.0 |
| /r/ | /r/ | 0.0 | 0.328125* |
| /ai/ | /uh/ | 0.375 | |
| / / | /m/ | 0.7 | 0.7 |
| /p/ | /p/ | 0.0 | 0.0 |
| / / | /s/ | 0.56 | 0.56 |

**the phoneme score has been adjusted down because the insertion of a gap at the beginning or the end of a word has less of a difference effect.

Thus, the similarity ranking for the phoneme alignment illustrated in FIG. 6 is, therefore, 1.868125.

In practice a large number of different alignments between the same set of two phoneme strings is analysed and only the one with the best (i.e., lowest) similarity ranking is retained.

In some cases the efficiency of the alignment and scoring process can be improved using a conventional algorithm known as 'dynamic programming'. This algorithm, optionally, may be used to examine all possible alignments of the target and reference strings in an efficient manner.

The scoring rules described above can be modified so that scores derived from parts of the alignment nearer to the beginning of the strings are amplified and scores derived from later parts of the alignment attenuated. The effect of this is to bias the similarity ranking to favour (other things being equal) those matches whose initial parts are similar over those whose final parts are similar. This is in accordance with how the similarity of trademarks is judged manually and leads to more accurate results.

The scoring rules described above can be modified to enable the user of the searching system to identify parts of a target trademark which are more significant than others. This indication is preserved by the text-to-phoneme units 15 so that some of the phonemes in the target phoneme string are marked as significant. The scores derived from parts of the alignment involving these more significant phonemes are amplified. The effect of this is to bias the scoring to favour (other things being equal) those strings where there is an aural match in the parts indicated as more significant. The system can therefore emulate more accurately the manual process of judging the similarity of trademarks, where generic parts of a trademark e.g. "company" or wholly descriptive words are normally given less weight.

The scored results are then sorted into increasing order of score, in the unit marked 'sort' in FIG. 1. The result is a list of the reference marks in descending order of perceived aural similarity to the target mark. The sorted results can then be displayed to the user, much like those produced by an Internet search engine.

Although the ranking is described in relation to a low score representing high similarity, it is possible for the reciprocal of the score to be determined in which case a low score will represent a low degree of similarity.

Registered trademarks are assigned to one or more classes which are representative of the specific businesses in relation to which the registered trademark is intended to be used. Where the trademark class (or classes) of the target trademark is known, it is possible to divide the search results into three groups: those reference marks registered in the same trademark class as the (or a) class of the target trademark; reference marks registered in classes related to the (or a) class of the target trademark, i.e., those classes in which a cross-search (pre-defined associations between classes) would be triggered; and reference marks in other classes.

It can be seen that the searching system described above can readily be adapted to analyse the visual similarity of two marks by omitting the text-to-phoneme conversion units and treating letters of the alphabet as if they were phonemes in the subsequent components of the system.

Although in FIG. 2 the reference trademarks are shown being input into the conversion unit 15, it will be immediately apparent that in an alternative, the phoneme strings for each reference trademark may be identified in advance and stored in association with the reference trademark in the data store 2.

The specific example given above of a trademark searching system contains details which are not essential to the present invention and which may be altered and adjusted where necessary. In particular, to aid understanding the searching method has been described in relation to functional units. In practice, such functional units are preferably implemented in a software program product or alternatively in an ASIC. The scope of the present invention is defined solely in the accompanying claims.

I claim:

1. An aural similarity measuring system for measuring the aural similarity of texts comprising:
   a text input interface;
   a reference text source providing access to a plurality of reference texts;
   a processor adapted to
   a) convert an input text into a string of phonemes,
   b) to adjust the phoneme string of the input text and a phoneme string of a reference text from said reference text source so that the two phoneme strings are equal in length,
   c) to assign a similarity score to the reference text representative of the similarity of the two phoneme strings, and
   d) to repeat steps b) and c) for at least one further reference text from said reference text source; and
   an output interface adapted to output a plurality of reference texts to which similarity scores have been assigned and their respective assigned similarity scores.

2. An aural similarity measuring system as claimed in claim 1, further comprising a data store in which is stored said plurality of reference texts.

3. An aural similarity measuring system as claimed in claim 2, wherein the data store further contains a plurality of phoneme strings each string being associated with a reference text.

4. An aural similarity measuring system as claimed in claim 2, wherein the processor is further adapted to select from the reference texts to which similarity scores have been assigned a sub-group of reference texts and their assigned similarity scores for outputting via the output interface, the selection being based on the similarity score assigned to each reference text.

5. An aural similarity measuring system as claimed in claim 1, wherein the processor is adapted to determine all possible adjustments of one or both of the input text phoneme string and the reference text phoneme string and is adapted to identify the similarity score representing the highest measure of similarity with respect to all of the possible phoneme string adjustments.

6. An aural similarity measuring system as claimed in claim 1, wherein the processor is adapted to adjust the phoneme strings of both of the input text and the reference text by inserting gaps into the phoneme strings.

7. An aural similarity measuring system as claimed in claim 1, wherein the processor is adapted to identify aligned phonemes which differ;
   to allocate predetermined phoneme scores for each pair of differing aligned phonemes; and to summing the individual phoneme scores to thereby assign a similarity score to the reference text.

8. An aural similarity measuring system as claimed in claim 7, wherein the processor is adapted to weight the phoneme scores in dependence upon the position of the pair of phonemes in the phoneme strings.

9. An aural similarity measuring system as claimed in claim 7, wherein the processor is adapted to weight the phoneme scores such that phoneme scores arising from partial text predetermined as less relevant which is present in the input text are lower than equivalent phoneme scores arising from other partial text in the input text.

10. An aural similarity measuring system as claimed in claim 7, wherein the processor is adapted to allocate a higher phoneme score to a grouping of non-adjusted aligned phonemes than to an equivalent grouping of aligned phonemes which have been adjusted.

11. An aural similarity measuring system as claimed in claim 1, wherein the processor, input interface and output interface are provided in a desktop computer.

12. A trademark searching system comprising an aural similarity measuring system in accordance with claim 1, wherein the reference text source comprises a trademark data source providing access to a plurality of trademarks and the processor is adapted to generate a plurality of similarity scores with respect to the aural similarity between an input trademark and a plurality of reference trademarks from the trademark data source.

13. An aural similarity measuring server comprising:
an input/output interface adapted for communication with one or more remote user terminals and further adapted to receive an input text;
a data store in which is stored a plurality of reference texts; and
a processor adapted to
a) convert the input text into a string of phonemes,
b) to adjust the phoneme string of the input text and a phoneme string of a reference text from said data store so that the two phoneme strings are equal in length,
c) to assign a similarity score to the reference text representative of the similarity of the two phoneme strings, and
d) to repeat steps b) and c) for at least one further reference text from said data store, wherein
said input/output interface is further adapted to output a plurality of reference texts to which similarity scores have been assigned and their respective assigned similarity scores.

14. An aural similarity measuring server as claimed in claim 13, wherein the data store further contains a plurality of phoneme strings each string being associated with a reference text.

15. An aural similarity measuring server as claimed in claim 13, wherein the processor is further adapted to select from the reference texts to which similarity scores have been assigned a sub-group of reference texts and their assigned similarity scores for outputting via the output interface, the selection being based on the similarity score assigned to each reference text.

16. An aural similarity measuring server as claimed in claim 13, wherein the processor is adapted to determine all possible adjustments of both the input text phoneme string and the reference text phoneme string and is adapted to identify the score representing the highest measure of similarity with respect to all of the possible phoneme string adjustments.

17. An aural similarity measuring server as claimed in claim 13, wherein the processor is adapted to adjust the phoneme strings of both the input text and/or the reference text by inserting gaps into the phoneme strings.

18. An aural similarity measuring server as claimed in claim 13, wherein the processor is adapted to identify aligned phonemes which differ; to allocate predetermined phoneme scores for each pair of differing aligned phonemes; and to summing the individual phoneme scores to thereby assign a score to the reference text.

19. An aural similarity measuring server as claimed in claim 18, wherein the processor is adapted to weight the phoneme scores in dependence upon the position of the pair of phonemes in the phoneme strings.

20. An aural similarity measuring server as claimed in claim 18, wherein the processor is adapted to weight the phoneme scores such that phoneme scores arising from partial text predetermined as less relevant which is present in the input text are lower than equivalent phoneme scores arising from other partial text in the input text.

21. An aural similarity measuring server as claimed in claim 18, wherein the processor is adapted to allocate a higher phoneme score to a grouping of non-adjusted aligned phonemes than to an equivalent grouping of aligned phonemes which have been adjusted.

22. A trademark searching server comprising an aural similarity server in accordance with claim 13, wherein a plurality of reference trademarks are stored in the data store and the processor is adapted to generate a plurality of similarity scores with respect to the aural similarity between an input trademark and a respective plurality of reference trademarks from the data store.

23. A computer readable medium encoded with a computer program for execution on a computer or server comprising at least one processor to cause the computer or server to perform an aural similarity measuring method, the computer program comprising program instructions for performing the following steps:
a receiving step in which an input text for which an aural similarity score is required is received;
a conversion step in which the input text is converted into a string of phonemes;
an adjustment step in which the phoneme string for the input text and a phoneme string associated with a reference text is adjusted so that the two phoneme strings are equal in length;
a ranking step in which the similarity of the two phoneme strings is assigned a similarity score;
a repeating step in which the adjustment step and the ranking step are repeated for further reference texts; and
an output step in which a plurality of reference texts to which similarity scores have been assigned and their assigned similarity scores are output to the user.

24. A computer readable medium encoded with a computer program as claimed in claim 23, further comprising a selection step in advance of the output step wherein a sub-group of reference texts is selected from the plurality of reference texts to which similarity scores have been assigned for outputting, the selection being based on the similarity score assigned to each reference text.

25. A computer readable medium encoded with a computer program as claimed in claim 23, wherein the adjustment step comprises determining all possible adjustments of both of the input text phoneme string and the reference text phoneme string and the ranking step identifies the lowest similarity score with respect to all of the possible phoneme string adjustments.

26. A computer readable medium encoded with a computer program as claimed in claim 23, further comprising the step of accessing one or more reference texts and their associated phoneme strings from a data store.

27. A computer readable medium encoded with a computer program as claimed in claim 23, wherein the adjustment step comprises adding one or more gaps in the phoneme string.

28. A computer readable medium encoded with a computer program as claimed in claim 27, wherein the one or more gaps made be added to the beginning or end of a phoneme string.

29. A computer readable medium encoded with a computer program as claimed in claim 23, wherein the ranking step comprises identifying aligned phonemes which differ; allocating predetermined phoneme scores for each pair of differing aligned phonemes and summing the individual phoneme scores.

30. A computer readable medium encoded with a computer program as claimed in claim 29, wherein the phoneme scores are weighted in dependence upon the position of the pair of phonemes in the phoneme strings.

31. A computer readable medium encoded with a computer program as claimed in claim 29, wherein the phoneme scores are weighted such that phoneme scores arising from partial text predetermined as less relevant in the input text are lower than equivalent phoneme scores arising from other partial text in the input text.

32. A computer readable medium encoded with a computer program as claimed in claim 29, wherein a higher phoneme score is allocated to a grouping of non-adjusted aligned phonemes than to an equivalent grouping of aligned phonemes which have been adjusted.

33. A computer readable medium encoded with a computer program having instructions for trademark searching, the computer program comprising program instructions in accordance with claim 32 wherein the reference text comprises a plurality of reference trademarks and the processor is adapted to generate similarity scores with respect to the aural similarity between an input trademark and said plurality of reference trademarks.

34. An aural similarity measuring method for measuring the aural similarity of texts, the method comprising the steps of:
   via a user input interface receiving an input text for which an aural similarity score is required; and
   causing a computer or server to perform the following steps:
   a) converting the input text into a string of phonemes;
   b) accessing a reference text from a data store;
   c) adjusting the phoneme string for the input text and a phoneme string associated with the reference text so that the two phoneme strings are equal in length;
   d) ranking the similarity of the two phoneme strings to assign a similarity score; and
   e) repeating steps b) to d) for at least one further reference text; and
   via an output interface outputting a plurality of reference texts to which similarity scores have been assigned and their assigned similarity scores to the user.

35. A trademark searching method for measuring the aural similarity of trademarks, the method comprising the steps of:
   via a user input interface receiving an input trademark for which an aural similarity score is required; and
   causing a computer or server to perform the following steps:
   converting the input trademark into a string of phonemes;
   accessing a reference trademark from a data store;
   adjusting the phoneme string for the input trademark and a phoneme string associated with the reference trademark so that the two phoneme strings are equal in length;
   ranking the similarity of the two phoneme strings to assign a similarity score;
   repeating the accessing, adjusting and ranking steps for further reference trademarks; and
   via an output interface outputting a plurality of reference trademarks to which similarity scores have been assigned and their assigned similarity scores to the user.

* * * * *